US010810727B2

(12) United States Patent
Liu et al.

(10) Patent No.: US 10,810,727 B2
(45) Date of Patent: *Oct. 20, 2020

(54) ANALYSIS APPARATUS, ANALYSIS METHOD, AND STORAGE MEDIUM

(71) Applicant: NEC CORPORATION, Tokyo (JP)

(72) Inventors: Jianquan Liu, Tokyo (JP); Ka Wai Yung, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,268

(22) Filed: Apr. 12, 2019

(65) Prior Publication Data
US 2019/0244341 A1 Aug. 8, 2019

Related U.S. Application Data

(63) Continuation of application No. 15/755,607, filed as application No. PCT/JP2015/004384 on Aug. 28, 2015.

(51) Int. Cl.
G06T 7/00 (2017.01)
G06K 9/00 (2006.01)
(Continued)

(52) U.S. Cl.
CPC ........ *G06T 7/0002* (2013.01); *G06K 9/00765* (2013.01); *G06T 7/11* (2017.01);
(Continued)

(58) Field of Classification Search
None
See application file for complete search history.

(56) References Cited

U.S. PATENT DOCUMENTS

2012/0020518 A1* 1/2012 Taguchi ................. G06T 7/292
382/103
2015/0341599 A1* 11/2015 Carey .................... H04N 7/181
348/150

FOREIGN PATENT DOCUMENTS

JP 2010-191620 A 9/2010
JP 2012-033053 A 2/2012
(Continued)

OTHER PUBLICATIONS

"Multimedia Data Mining: State of the Art and Challenges", Multimedia Tools and Applications, SpringerLink, Jan. 2011, pp. 35-76, vol. 51, Issue 1.
(Continued)

Primary Examiner — Kevin Ky
(74) Attorney, Agent, or Firm — Sughrue Mion, PLLC

(57) ABSTRACT

The analysis apparatus (2000) includes a co-appearance event extraction unit (2020) and a frequent event detection unit (2040). The co-appearance event extraction unit (2020) extracts co-appearance events of two or more persons from each of a plurality of sub video frame sequences. The sub video frame sequence is included in a video frame sequence. The analysis apparatus (2000) may obtain the plurality of sub video frame sequences from one or more of the video frame sequences. The one or more of the video frame sequences may be generated by one or more of surveillance cameras. Each of the sub video frame sequences has a predetermined time length. The frequent event detection unit (2040) detects co-appearance events of the same persons occurring at a frequency higher than or equal to a predetermined frequency threshold.

9 Claims, 23 Drawing Sheets

(51) Int. Cl.
*G06T 7/187* (2017.01)
*G06T 7/11* (2017.01)
*H04N 7/18* (2006.01)
*G06Q 50/26* (2012.01)

(52) U.S. Cl.
CPC ............ *G06T 7/187* (2017.01); *H04N 7/188* (2013.01); *G06Q 50/265* (2013.01); *G06T 2207/30242* (2013.01)

(56) References Cited

FOREIGN PATENT DOCUMENTS

| | | |
|---|---|---|
| JP | 2012-212216 A | 11/2012 |
| JP | 2015-049574 A | 3/2015 |
| WO | 2014/109127 A1 | 7/2014 |

OTHER PUBLICATIONS

International Search Report for PCT/JP2015/004384 dated Nov. 17, 2015 [PCT/ISA/210].
Written Opinion for PCT/JP2015/004384 dated Nov. 17, 2015 [PCT/ISA/237] English Translation.

* cited by examiner

FIG. 9

| Label | Facial Feature |
|-------|----------------|
| $A$   | $v_1$          |

FIG. 10

| Label | Facial Feature |
|-------|----------------|
| $A$   | $v_1$          |
| $B$   | $v_2$          |

FIG. 11

| Label | Facial Feature |
|---|---|
| $A$ | $v_1$ |
| $B$ | $v_2$ |
| $C$ | $v_3$ |

FIG. 12

| Label | Facial Feature |
|---|---|
| A | $v_1, v_4$ |
| B | $v_2$ |
| C | $v_3, v_5$ |
| D | $v_6$ |

FIG. 13

| Label | Facial Feature |
|---|---|
| A | $v_1, v_4, v_7$ |
| B | $v_2$ |
| C | $v_3, v_5$ |
| D | $v_6$ |

FIG. 18

Label Table

| Label | Count |
|---|---|
| A | 1 |
| B | 1 |
| C | 1 |

Count Table

| Co-Appearance Event | Count | Latest Update |
|---|---|---|
| AB | 1 | 3 |
| BC | 1 | 3 |
| AC | 1 | 3 |

FIG. 19

Label Table

| Label | Count |
|---|---|
| A | 1−1+1=1 |
| B | 1 |
| C | 1+1=2 |
| D | 1 |

Count Table

| Co-Appearance Event | Count | Latest Update |
|---|---|---|
| AB | 1 | 3 |
| BC | 1 | 3 |
| AC | 1 | 3 |
| AD | 1 | 4 |
| BD | 1 | 4 |
| CD | 1 | 4 |

FIG. 20

Label Table

| Label | Count |
|-------|-------|
| A | 1+1=2 |
| ~~B~~ | ~~1~~ ← Delete |
| C | 2 |
| D | 1 |

Count Table

| Co-Appearance Event | Count | Latest Update |
|---------------------|-------|---------------|
| AB | 1 | 3 |
| BC | 1 | 3 |
| AC | 1 | 3 |
| AD | 1 | 4 |
| BD | 1 | 4 |
| CD | 1 | 4 |

FIG. 22

Definition 1 [High Dimensional Binary Feature] : *A high dimensional binary feature HBF is a high dimensional vector with binary domain for each dimension and each vector is associated with a timestamp (an integer).*

Definition 2 [Label Assignment Function]: *$id = fm(HBF)$ is a function which maps a high dimensional binary feature to an ID with a timestamp.*

Definition 3 [Frame]: *A frame fr contains a set of ID(s) with the same timestamp.*

Definition 4 [Video Frame Sequence]: *A video frame sequence S is a sequence of frame ordered by timestamp. $|S|$ denotes the number of frames in S. $S[a, b]$ denotes the subsequence starting and ending at timestamp a and b respectively, where $b \geq a$.*

Definition 5 [Sliding Window]: *A sliding window $w_s$ is a pair of timestamps $(t_{start}, t_{end})$, where $t_{end} \geq t_{start}$ and $w = t_{end} - t_{start}$ is the size of the sliding window.*

Definition 6 [Event]: *An event e is a set of IDs with size of $e \geq 2$ and all IDs in e are distinct.*

Definition 7 [Contain Relationship] : *A sliding window $w_s$ contains an event e if for all IDs id in the event e, there exists an ID id' in the frames fr between $t_{start}$ to $t_{end}$ of the video frame sequence equals to id. $\forall id \in e, \exists id' \in fr$ s.t. $fr \in S[t_{start}, t_{end}]$ and $id = id'$ if $w_s$ contins e*

FIG. 23

Definition 8 [Pattern Frequency]: *The frequency of an event $e$ $f(e, S, w_s)$ is defined as the number of non-overlap sliding windows $w_s$ within $S$ that contains $e$.*

$f(e, S, ws) = |\{(a_i, b_i)|$ $b_i = a_i + w - 1,$ where $1 \leq a_i, b_i \leq |S|$ and $S[a_i, b_i] \cap S[a_j, b_j] = \emptyset$ ; for $i \neq j$ and $S[a_i, b_i]$ contains $e\}|$ where $a_i$ and $b_i$ are timestamps of frames in $S$.

Definition 9 [Stalking Event]: *Given a video frame sequence $S$, a sliding window $w_s$, and a frequency threshold $\omega$, a stalking event $e_{stalking}$ is an event $e$ with frequency $\geq \omega$* $e_{stalking} = e$ if $f(e, S, w_s) \geq \omega$ Definition 10 [Stalking Event Query]: *Given a video frame sequence $S$, a sliding window $w_s$, and a frequency threshold $\omega$, find all stalking events $e_{stalking}$ and start and end time of each non-overlap sliding window that contains $e_{stalking}$.*

$e_{stalking} = \{e_{stalking} \mid f(e_{stalking}, S, w_s) \geq \omega \}$

ANALYSIS APPARATUS, ANALYSIS METHOD, AND STORAGE MEDIUM

CROSS REFERENCE TO RELATED APPLICATIONS

This application is a Continuation of U.S. application Ser. No. 15/755,607 filed Feb. 27, 2018, which is a National Stage of International Application No. PCT/JP2015/004384 filed Aug. 28, 2015, the disclosures of which are incorporated herein by reference in their entirety.

TECHNICAL FIELD

Embodiments of the invention generally relate to the field of video analysis.

BACKGROUND ART

The video surveillance system is widely used to record and analyze crimes. For example, investigative organizations use the surveillance video to track the activities of the suspect of a crime.

In addition, in order to prevent crimes, it is preferable that the video surveillance system is used to detect a suspicious activity implying a crime, like stalking, theft, robbery, assault, rape, and battery. For analyzing video, video mining technology has been developed. NPL 1 summarizes video mining techniques into 3 categories: classification, clustering, and association. Classification mining approaches classify video objects into pre-determined categories. Clustering mining approaches organizing similar video objects (e.g. raw video sequences, shots, and still image) by their features into clusters. Association mining approaches usually extracting features of video objects for constructing structural data, which can be mined using conventional association rule mining algorithms.

RELATED DOCUMENT

Patent Document

[Patent Document 1] PCT International Publication No. WO 2014/109127
[Patent Document 2] Japanese Patent Application Publication No. 2015-49574

Non Patent Document

[Non Patent Document 1] "Multimedia Data Mining: State of the Art and Challenges", Multimedia Tools and Applications 2011, Volume 51, Issue 1, pp 35-76

SUMMARY OF THE INVENTION

Technical Problem

Detecting a suspicious activity implying a crime by analyzing the surveillance video inherently involves some difficulties. First, target entities to be detected, e.g. victim or suspect, are not known since the crime is not detected yet. Second, a victim and an offender of a crime do not necessarily appear together in a single video frame of the surveillance video. For example, an offender of a stalking behavior may follow a victim with keeping a certain distance from the victim. In this case, the offender could be captured in a different video frame from that of the victim. Thus, analyzing individual video frames of the surveillance video separately is not enough to find out such a suspicious activity of a crime.

The objective of the present invention is to provide a technique to detect a suspicious activity of a crime from video frame sequences.

Solution to Problem

The present invention provides an analysis apparatus comprising: 1) a co-appearance event extraction unit extracting a co-appearance event of two or more persons from each of a plurality of sub video frame sequences of one or more of video frame sequences generated by one or more of surveillance cameras, each of the sub video frame sequences having a predetermined time length; and 2) a frequent event detection unit detecting co-appearance events of same persons occurring at a higher frequency than a pre-determined frequency threshold. Wherein in at least one of the co-appearance events of two or more persons, a first video frame from which a person is extracted is different from a second video frame from which another person is extracted.

The present invention provides an analysis method executed by a computer. The method comprises: 1) a co-appearance event extraction step of extracting a co-appearance event of two or more persons from each of a plurality of sub video frame sequences of one or more of video frame sequences generated by one or more of surveillance cameras, each of the sub video frame sequences having a predetermined time length; and 2) a frequent event detection step of detecting co-appearance events of same persons occurring at a frequency higher than or equal to a pre-determined frequency threshold. Wherein in at least one of the co-appearance events of two or more persons, a first video frame from which a person is extracted is different from a second video frame from which another person is extracted.

The present invention provides a non-transitory computer-readable storage medium storing a program causing a computer to execute each step of the analysis method provided by the present invention.

Advantageous Effects of Invention

In accordance with the present invention, a technique to detect a suspicious activity of a crime from video frame sequences is provided.

BRIEF DESCRIPTION OF THE DRAWINGS

The above-mentioned objects, other objects, features and advantages will be made clearer from the preferred exemplary embodiments described below, and the following accompanying drawings.

FIG. 9 is a first diagram illustrating the people label table.

FIG. 10 is a second diagram illustrating the people label table.

FIG. 11 is a third diagram illustrating the people label table.

FIG. 12 is a forth diagram illustrating the people label table.

FIG. 13 is a fifth diagram illustrating the people label table.

FIG. 18 illustrates the label table and count table after the update at time $t_3$.

FIG. 19 illustrates the label table and count table after the update at time $t_4$.

FIG. 20 illustrates the label table and count table after the update at time $t_5$.

FIG. 22 shows an example of formal definitions of data structures handled by the analysis apparatus.

FIG. 23 shows an example of formal definitions of data structures handled by the analysis apparatus.

DESCRIPTION OF EMBODIMENTS

Figure 1:
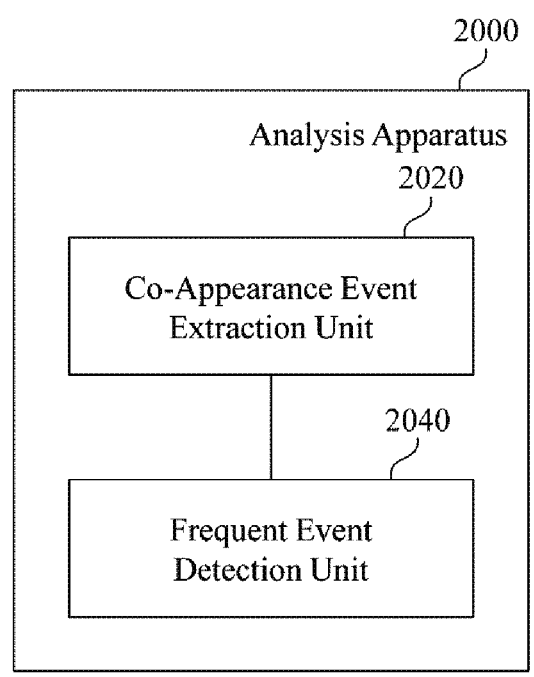
FIG. 1 is a block diagram illustrating an analysis apparatus 2000 according to Exemplary embodiment 1.

Hereinafter, exemplary embodiments of the present invention will be described with reference to the accompanying drawings. In all the drawings, like elements are referenced by like reference numerals and the descriptions thereof will not be repeated.

Exemplary Embodiment 1

FIG. 1 is a block diagram illustrating an analysis apparatus 2000 according to Exemplary embodiment 1. In FIG. 1, each block represents a function-based configuration block rather than a hardware-based configuration block.

The analysis apparatus 2000 includes a co-appearance event extraction unit 2020 and a frequent event detection unit 2040. The co-appearance event extraction unit 2020 extracts co-appearance events of two or more persons from each of a plurality of sub video frame sequences. The sub video frame sequence is included in a video frame sequence. The analysis apparatus 2000 may obtain the plurality of sub video frame sequences from one or more of the video frame sequences. The one or more of the video frame sequences may be generated by one or more of surveillance cameras. Each of the sub video frame sequences has a predetermined time length. The frequent event detection unit 2040 detects the co-appearance events of the same persons occurring at a frequency higher than or equal to a pre-determined frequency threshold.

Conceptually, the analysis apparatus 2000 detects a suspicious activity implying a crime (suspicious activity, for short) from video frame sequences generated by surveillance cameras. Here, the suspicious activity may include arbitrary activities involving at least two entities, i.e. a victim and an offender. Examples of the suspicious activity are stalking, theft, robbery, assault, rape, and battery.

The co-existence of two people in a video frame may also imply a suspicious activity. However, it is also possible that the offender and victim appear a few frames away from each other, such as the offender is following the victim. Furthermore, a single co-existence of two persons may not be an unusual situation while frequent co-existence of two persons is more likely to imply happening of a crime.

Figure 2A:
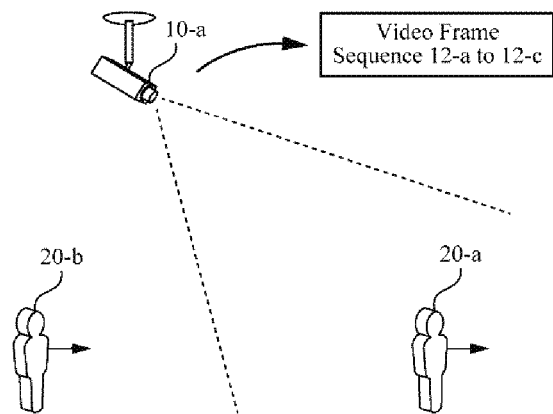
FIGS. 2A and 2B illustrate an example of a suspicious activity that the analysis apparatus 2000 detects.
Figure 2B:
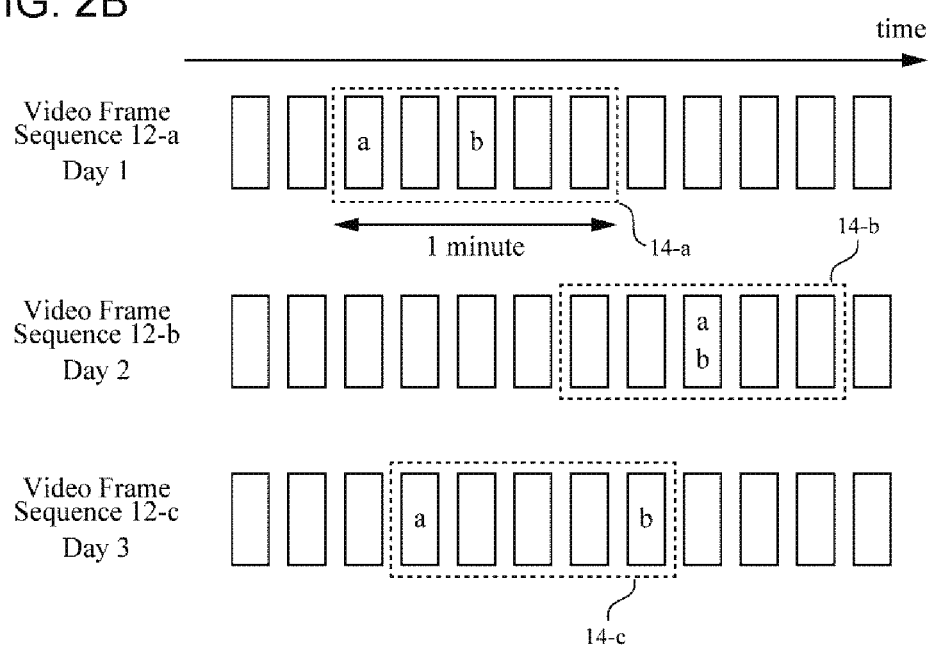

FIGS. 2A and 2B illustrate an example of a suspicious activity that the analysis apparatus 2000 detects. FIG. 2A illustrates a stalking behavior, an example of a suspicious activity. In FIG. 2A, there is a surveillance camera 10-$a$. A person 20-$a$ is a victim of the stalking behavior, and walks through an area monitored by the surveillance camera 10-$a$. A person 20-$b$ is an offender of the stalking behavior, and walks through the same area shortly after the person 20-$a$.

FIG. 2B shows video frame sequences generated by the surveillance camera 10-$a$. Video frame sequences 12-$a$ to 12-$c$ are generated by the surveillance camera 10-$a$ on different days: Day 1, Day 2, and Day 3, respectively. In FIG. 2B, each rectangle with a solid line illustrates a video frame. A video frame including the character "a" illustrates a video frame in which the person 20-$a$ is captured. A video frame including the character "b" illustrates a video frame in which the person 20-$b$ is captured.

Except Day 2, the person 20-$a$ and 20-$b$ do not appear in the same video frame since the person 20-$b$ keeps a certain distance from the person 20-$a$. Thus, it cannot make sure that the person 20-$b$ does the stalking behavior by separately analyzing each video frame.

However, since the person 20-$b$ follows the person 20-$a$, the person 20-$b$ would appear shortly after the person 20-$a$. Thus, a video frame in which the person 20-$a$ appears and a video frame in which the person 20-$b$ does are included in a certain time window of the video frame sequences. For example, in the video frame sequence 12-$a$, they are included in a sub video frame sequence 14-$a$ the length of which is 1 minute. Similarly, in the video frame sequence 12-$c$, they are included in a sub video frame sequence 14-$c$. In the video frame sequence 12-$b$, they are included in the same video frame, and thus they are included in a sub video frame sequence 14-$b$. The lengths of the sub video frame sequences 14-$b$ and 14-$c$ are also 1 minute.

As described above, co-appearance of multiple persons can be detected by analyzing video frame sequences by a unit of a sub video frame sequence, not by frame. In addition, from this frequent co-appearance of the persons 20-$a$ and 20-$b$, it is able to detect a suspicious stalking behavior.

Figure 3A:
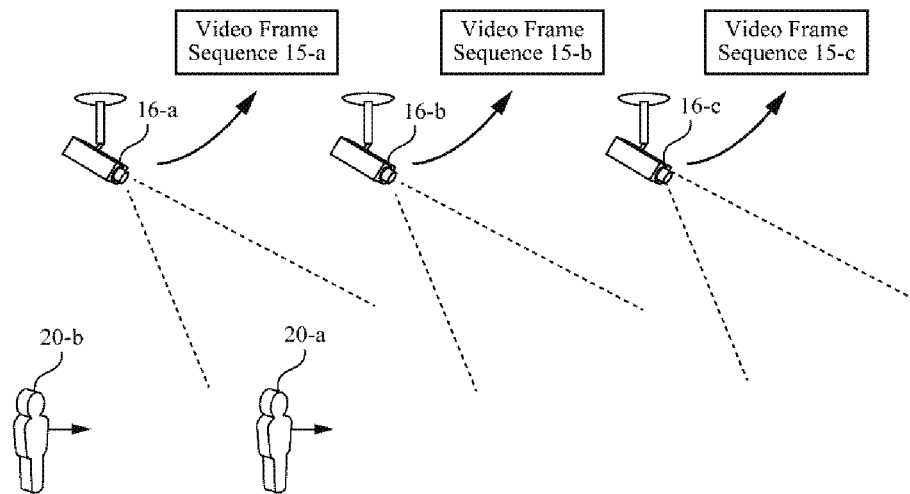
FIGS. 3A and 3B illustrate co-appearance of two persons captured by three surveillance videos.
Figure 3B:
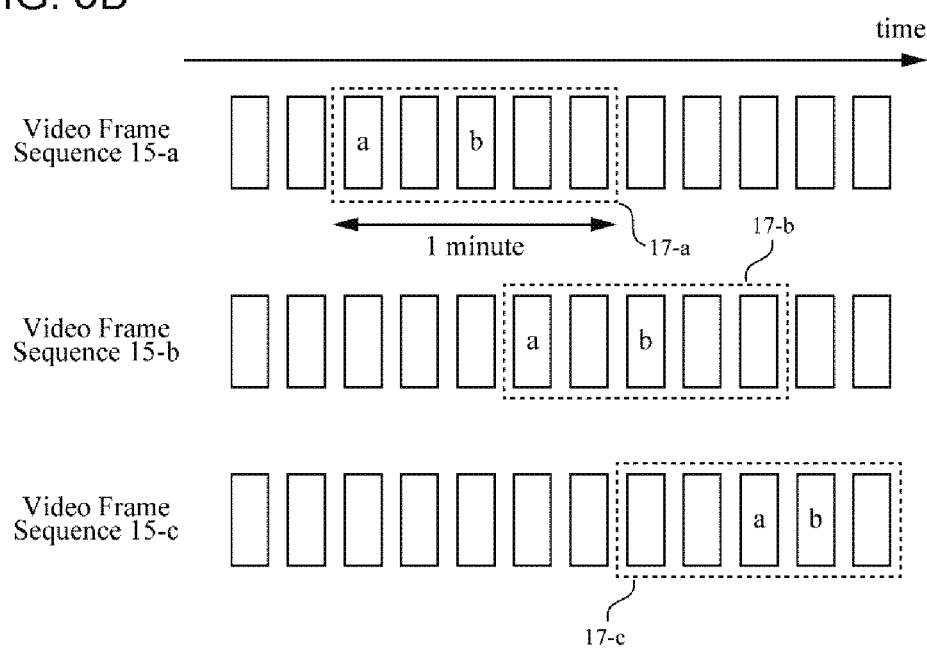

Note that, the frequent co-appearance of multiple persons can also be captured by not only a single surveillance camera, but also by multiple ones as the offender may move along with the victim for a certain distance. FIGS. 3A and 3B illustrate co-appearance of two persons captured by three surveillance videos.

FIG. 3A illustrates a stalking behavior similarly to FIG. 2A. As described in FIG. 3A, the person 20-$a$ and the person 20-$b$ walks through areas monitored by the surveillance cameras 16-$a$ to 16-$c$. The surveillance cameras 16-$a$ to 16-$c$ record different places.

FIG. 3B shows video frame sequences 15-$a$ to 15-$c$, which are generated by the surveillance cameras 16-$a$ to 16-$c$, respectively. The persons 20-$a$ and 20-$b$ are included in a sub video frame sequence 16-$a$ of the video frame sequence 15-$a$, in a sub video frame sequence 16-$b$ of the video frame sequence 15-$b$, and in a sub video frame sequence 16-*c* of the video frame sequence 15-*c*. This frequent co-appearance of the persons 20-*a* and 20-*b* implies a suspicious stalking behavior.

In order to detect such a suspicious activity, the analysis apparatus 2000 detects frequent co-appearance events of the same persons by the co-appearance event extraction unit 2020 and the frequent event detection unit 2040. Specifically, the co-appearance event extraction unit 2020 extracts co-appearance of multiple persons in a sub video frame sequence of video frame sequences. For example, the co-appearance event extraction unit 2020 extracts the co-appearance event of the persons 20-*a* and 20-*b* in the sub video frame 14-*a* of the video frame sequences 12-*a*, in the sub video frame 14-*b* of the video frame sequences 12-*b*, and in the sub video frame 14-*c* of the video frame sequences 12-*c*.

The frequent event detection unit 2040 detects the co-appearance events of the same persons occurring at a frequency higher than or equal to a pre-determined frequency threshold. Suppose that the predetermined frequency threshold is "three times during three days" in the case of FIGS. 2A and 2B. In FIGS. 2A and 2B, the co-appearance events of the persons 20-*a* and 20-*b* occur at a frequency equal to the predetermined frequency threshold. Thus, the frequent event detection unit 2040 detects the co-appearance events of the persons 20-*a* and 20-*b* as a suspicious activity.

<Advantageous Effects>

As described above, it is possible that a victim and an offender of a crime do not appear in the same video frame of a surveillance video, but appear in different video frames. Thus, such a crime cannot be found out by analyzing each video frame of the surveillance video separately.

In accordance with the analysis apparatus 2000 of the present exemplary embodiment, the detection of a co-appearance event of persons is performed analyzing the surveillance videos by a unit of a sub video frame sequences, not by frame. Thus, a suspicious activity of a crime involving multiple entities can be detected even if the entities are not close enough to be captured in the same video frame.

In the following descriptions, the detail of the analysis apparatus 2000 of the present Exemplary embodiment will be described.

<Example of Hardware Configuration>

In some embodiments, each functional unit included in the analysis apparatus 2000 may be implemented with at least one hardware component, and each hardware component may realize one or more of the functional units. In some embodiments, each functional unit may be implemented with at least one software component. In some embodiments, each functional unit may be implemented with a combination of hardware components and software components.

The analysis apparatus 2000 may be implemented with a special purpose computer manufactured for implementing the analysis apparatus 2000, or may be implemented with a commodity computer like a personal computer (PC), a server machine, or a mobile device.

Figure 4:
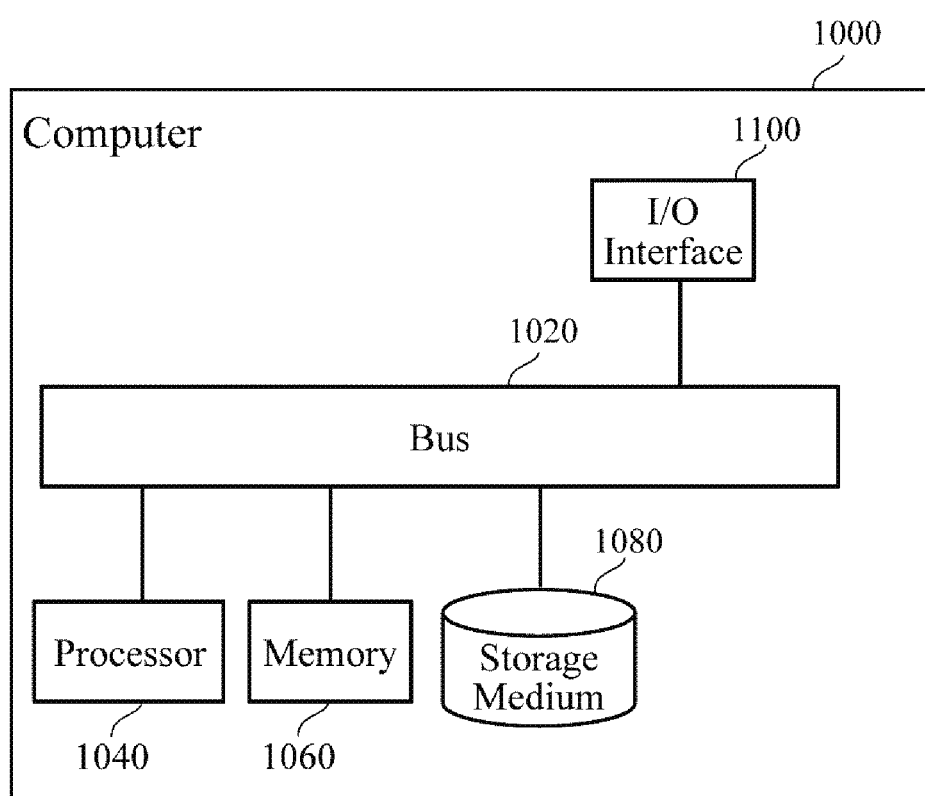
FIG. 4 is a block diagram illustrating an example of hardware configuration of a computer realizing the analysis apparatus.

FIG. 4 is a block diagram illustrating an example of hardware configuration of a computer 1000 realizing the analysis apparatus 2000. In FIG. 4, the computer 1000 includes a bus 1020, a processor 1040, a memory 1060, and a storage medium 1080.

The bus 1020 is a data transmission channel in order for the processor 1040, the memory 1060 and the storage medium 1080 to mutually transmit and receive data. The processor 1040 is an arithmetic processing unit, such as a CPU (Central Processing Unit) or a GPU (Graphics Processing Unit). The memory 1060 is a memory component, such as a RAM (Random Access Memory) or a ROM (Read Only Memory). The storage medium 1080 is a storage component, such as a memory card, a hard disk, or an SSD (Solid State Drive). In addition, the storage medium 1080 may be a memory device such as a RAM or a ROM.

The storage medium 1080 may store program modules, each of which is an implementation of a function-based unit of the analysis apparatus 2000. The CPU 1040 executes each program module, and thereby realizing each function-based unit of the analysis apparatus 2000.

The hardware configuration of the computer 1000 is not limited to the configuration shown in FIG. 4. For example, each of the program modules may be stored in the memory 1060, instead of the storage medium 1080. In this case, the computer 1000 is not necessary to include the storage medium 1080.

<Flow of Process>

Figure 5:
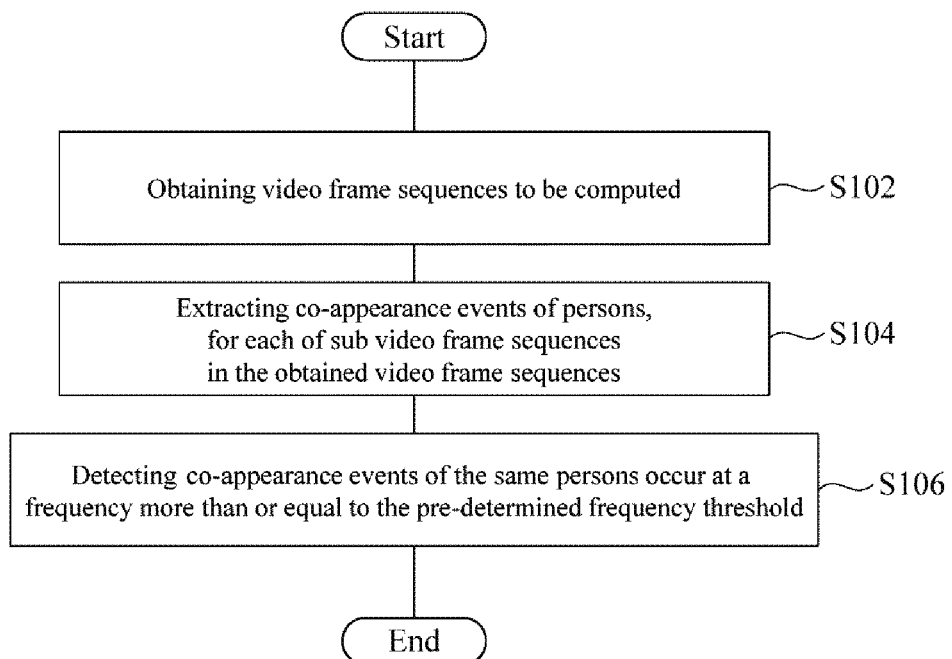
FIG. 5 illustrates a flow chart showing a flow of processes executed by the analysis apparatus.

FIG. 5 illustrates a flow chart showing a flow of processes executed by the analysis apparatus 2000. The analysis apparatus obtains video frame sequences to be computed (S102). For each of sub video frame sequences in the obtained video frame sequence, the co-appearance event extraction unit 2020 extracts co-appearance events of persons (S104). The frequent event detection unit 2040 detects co-appearance events of the same persons occur at a frequency higher than or equal to the pre-determined frequency threshold (S106).

<How to Obtain Video Frame Sequences>

The analysis apparatus 2000 obtains video frame sequences to be computed (S102). There are various ways to obtain them. In some embodiments, the analysis apparatus 2000 may obtain a video frame sequence from a surveillance camera that generates the video frame sequence. In some embodiments, the analysis apparatus 2000 may obtain a video frame sequence from a device outside the surveillance camera on which the surveillance camera stores the video frame sequences, e.g. a storage device connected to the surveillance camera through a bus or a server machine connected to that through a network.

<How to Extract Co-Appearance Event>

The co-appearance event extraction unit 2020 extracts a co-appearance event of multiple persons in a sub video frame sequences having a pre-determined time length from a video frame sequence (S104). Note that, the pre-determined time length may be set to the co-appearance event extraction unit 2020 in advance, or may be obtained from a storage medium storing the information indicating the pre-determined time length; the storage medium may be connected directly or indirectly to the analysis apparatus 2000.

In order to extract the co-appearance events of multiple persons, the co-appearance event extraction unit 2020 may perform 1) a feature-value extraction process, 2) a label assignment process, and 3) a combination scan process. These processes will be described below. Note that, the following processes are merely an example way of extracting the co-appearance events of multiple persons, and the way of extracting the co-appearance events of multiple persons is not limited to the following example.

«Feature-Value Extraction Process»

The co-appearance event extraction unit 2020 feeds the obtained video frame sequences, and extracts feature-values describing persons from each video frame of video frame sequences. The feature-value is, for example, a facial feature of a person. As a result, all feature-values of persons in the obtained video frame sequences are extracted.

Then, the co-appearance event extraction unit 2020 generates feature-value information, which associates an extracted feature-value with a timestamp. The timestamp is used to distinguish feature-values from each other in terms of the captured time of the video frame from which the feature value is extracted. For example, the timestamp to be associated with a feature value may be the frame number or the captured time of the video frame from which the feature-value is extracted.

Figure 6:
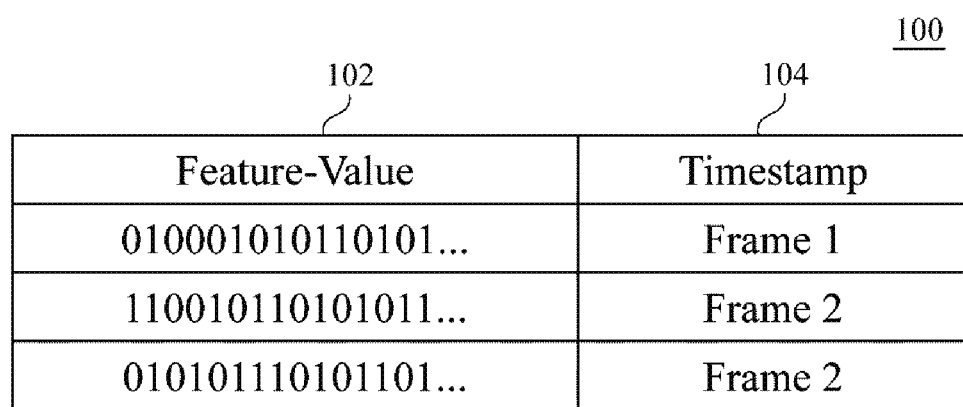
FIG. 6 illustrates feature-value information in a table form.

FIG. 6 illustrates feature-value information in a table form. A feature-value information table 100 has two columns: a feature-value column 102 and a timestamp column 104. In FIG. 6, the timestamp column 104 indicates a frame number of a video frame as a timestamp.

The feature-value column 102 may show a feature-value in a form of a high dimensional binary feature (HBF, for short). HBF is a high dimensional vector with binary domain for each dimension.

«Label Assignment Process»

Next, the co-appearance event extraction unit 2020 feeds pieces of feature-value information generated by the feature-value extraction process, and assigns a label to each of feature-value information. The label is a value for distinguishing persons described by the feature-values. Thus, feature-values describing different persons are assigned different labels. On the other hand, feature-values describing the same person are assigned the same label, even if their feature-values are not equal to each other.

Suppose that there are four pieces of feature-value information FI1 to FI4, and they show different feature-values; FI1, FI2, FI3, and FI4 show feature-values v1, v2, v3, and v4 respectively. Also suppose that v1 and v4 represent features of a person p1, and v2 and v3 represent features of a person p2. In this case, the co-appearance extraction unit 2020 assigns a label L1 to FI1 and FI4, and L2 to FI2 and FI3.

<<<Example for Label Assignment Algorithm>>>

Here, an example algorithm of label assignment process will be described. The inputs of this algorithm include pieces of feature-value information, a similarity function, and a similarity threshold. The similarity function takes two feature-values as parameters and output the similarity score, which represents how similar the two feature-values are. The similarity threshold is used to determine when two feature-values represent the same person. When the similarity score computed by the similarity function is higher than the similarity threshold, the system regards two feature-values representing the same person.

Except the input parameters, this algorithm needs to maintain a SimTree (PTL 1,2) and a people label table. SimTree is a data structure maintaining feature-values. The people label table is a data structure maintaining the association of the label and the feature-value information.

Every feature-value is used to query the SimTree. Initially, the SimTree is empty. If SimTree does not include a feature-value similar to that in the query, the query result from SimTree is empty, and the feature-value in the query is added into SimTree. On the other hand, if SimTree includes a feature-value similar to that in the query, the query result from SimTree is the most similar feature-value to that in the query. Note that, SimTree may be implemented in a computer where the analysis apparatus 2000 is implemented, or in another computer.

Figure 7:
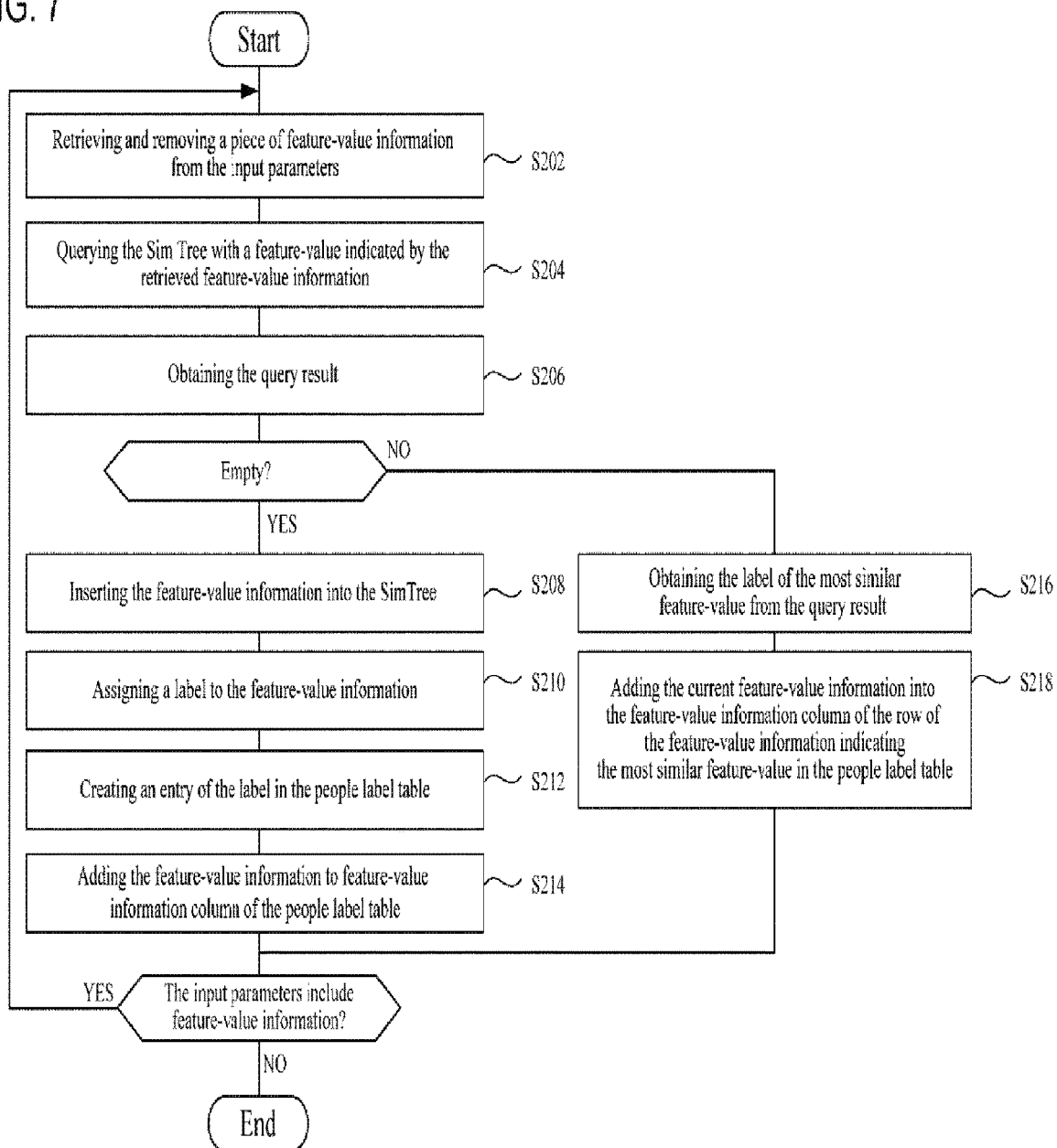
FIG. 7 illustrates an example flowchart of the label assignment algorithm.

The people label table contains two columns: label column and feature-value information column. The label column stores the label and the feature-value information column stores one or more pieces of feature-value information assigned the label. Initially, the people label table is also empty FIG. 7 illustrates an example flowchart of the label assignment algorithm. The detail of the label assignment algorithm will be described below with referring to FIG. 7.

The co-appearance extraction unit 2020 retrieves and removes a piece of feature-value information from the input parameters (S202).

The co-appearance extraction unit 2020 queries the SimTree with a feature-value indicated by the retrieved feature-value information (S204). The co-appearance extraction unit 2020 obtains the query result (S206).

If the query result is empty, the following steps S208 to S214 are performed. The co-appearance extraction unit 2020 inserts the feature-value information into the SimTree (S208). The co-appearance extraction unit 2020 assigns a label to the feature-value information (S210). The co-appearance extraction unit 2020 creates an entry of the label in the people label table (S212). The co-appearance extraction unit 2020 adds the feature-value information to feature-value information column of the people label table (S214).

If the query result is not empty, the following steps S216 and 218 are performed. The co-appearance extraction unit 2020 obtains the label of the most similar feature-value from the query result (S216). The co-appearance extraction unit 2020 adds the current feature-value information into the feature-value information column of the row of the feature-value information indicating the most similar feature-value in the people label table (S218). These steps mean that the label obtained by step S216 is assigned to the current feature-value information by step S218.

After performing step S214 or S218, the execution goes back to step S202 if the input parameters still include feature-value information. If not, the execution terminates.

Insertion and search of people label table (steps S208 to S214 and S216 to 218) can be done in O(1) if hash table is used. Hence, the worst case time complexity of the label assignment algorithm is O(n~simComp), where n is the number of feature-value information and simComp is the worst case time complexity of SimTree insertion and query.

<<<Example Case of Label Assignment Process>>>

Figure 8:
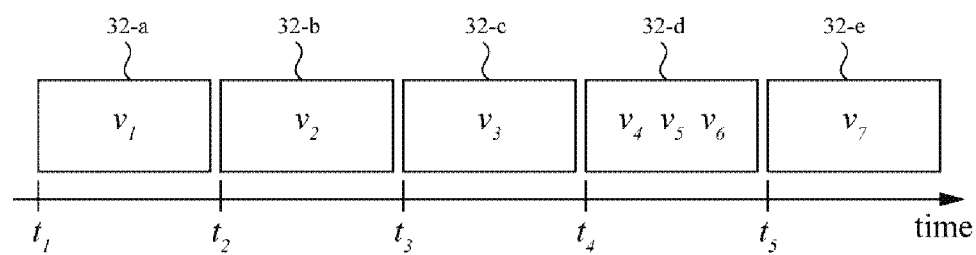
FIG. 8 illustrates the example case of the label assignment process.

FIG. 8 illustrates the example case of the label assignment process. A video frame sequence 30 includes five adjacent video frames 32-*a*, 32-*b*, 32-*c*, 32-*d*, and 32-*e*. The video frame 32-*a* contains facial feature v1; the video frame 32-*b* contains facial feature v2; the video frame 32-*c* contains facial feature v3; the video frame 32-*d* contains facial features v4, v5, and v6; the video frame 32-*e* contains facial feature v7. Suppose that v4 and v7 are similar to v1, and v5 is similar to v3.

Before the label assignment process, the co-appearance event extraction unit 2020 performs the feature-value extraction process for the video frames 32-*a* to 32-*e*. As a result, the feature-value information FI1 to FI7 are generated; FI1 associates v1 with a timestamp t1; FI2 associates v2 with a timestamp t2; FI3 associates v3 with a timestamp t3; FI4 associates v4 with a timestamp t4; FI5 associates v5 with the timestamp t4; FI6 associates v6 with the timestamp t4; and FI7 associates v7 with a timestamp t5. The label assignment process feeds FI1 to FI7 as input parameters.

Figure 9:
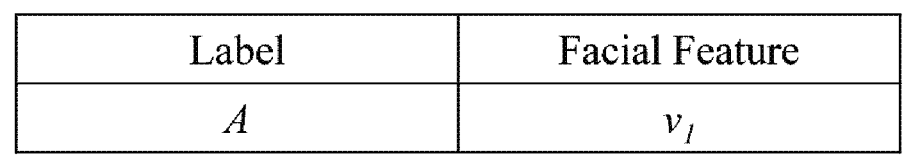

At the beginning, the SimTree and people label table are empty. The co-appearance event extraction unit 2040 retrieves FI1 from the input parameters, and queries the SimTree with v1 indicated by FI1. As the SimTree is empty, the query result is empty. Then, the co-appearance event extraction unit 2020 inserts v1 into the SimTree, and creates a new label A being associated with FI1 in the people label table. FIG. 9 describes the people label table at this time.

Figure 10:
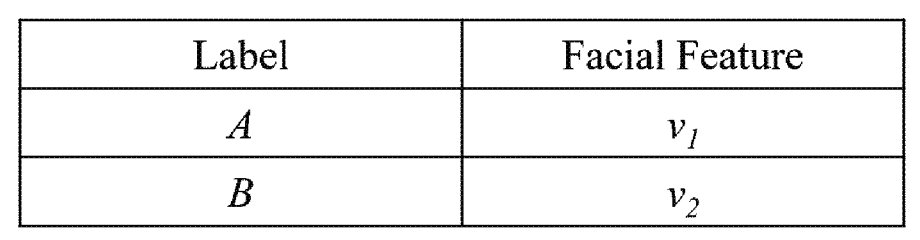

The co-appearance event extraction unit 2020 retrieves FI2 from the input parameters, and queries the SimTree with v2 indicated by FI2. Since v2 is not similar to v1, the query result is empty. Thus, the co-appearance event extraction unit 2020 inserts v2 into the SimTree, and creates a new label B being associated with FI2 in the people label table. FIG. 10 describes the people label table at this time.

Figure 11:
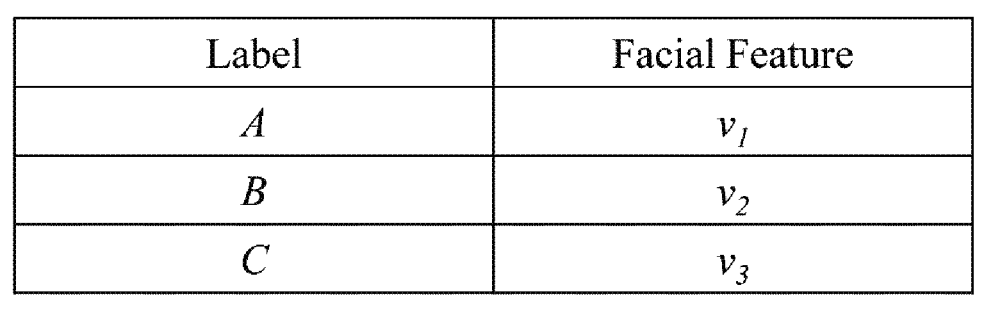

The co-appearance event extraction unit 2020 retrieves FI3 from the input parameters, and queries the SimTree with v3 indicated by FI3. Since v3 is not similar to v1 or v2, the query result is empty. Thus, the co-appearance event extraction unit 2020 inserts v3 into the SimTree, and creates a new label C being associated with FI3 in the people label table. FIG. 11 describes the people label table at this time.

The co-appearance event extraction unit 2020 retrieves FI4 from the input parameters, and queries the SimTree with v4 indicated by FI4. Here, since v4 is a facial feature similar to v1, the query result is v1. Thus, the co-appearance event extraction unit 2020 inserts FI4 into the feature-value information column of label A.

The co-appearance event extraction unit 2020 retrieves FI5 from the input parameters, and queries the SimTree with v5 indicated by FI5. Since v5 is a facial feature similar to v3, the query result is v3. Thus, the co-appearance event extraction unit 2020 inserts FI5 into the feature-value information column of label C.

Figure 12:
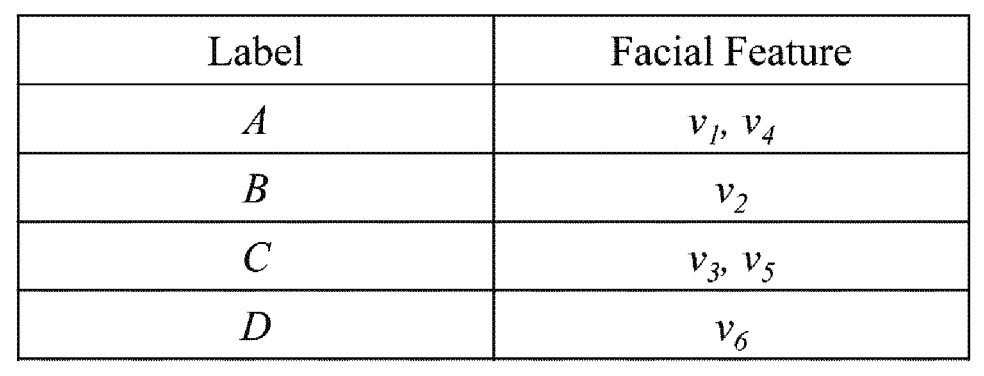

The co-appearance event extraction unit 2020 retrieves FI6 from the input parameters, and queries the SimTree with v6 indicated by FI6. Since there is no facial feature similar to v6, the query result is empty. Thus, the co-appearance event extraction unit 2020 inserts v6 into the SimTree, and creates a new label D being associated with FI6 in the people label table. FIG. 12 describes the people label table at this time.

Finally, the co-appearance event extraction unit 2020 retrieves FI7 from the input parameters, and queries the SimTree with v7 indicated by FI7. Since v7 is a facial feature similar to v1, the query result is v1. Thus, the co-appearance event extraction unit 2020 inserts FI7 into the feature-value information column of label A. FIG. 13 describes the people label table at this time.

As a result, the labels are assigned to facial features so that the same label is assigned to facial features similar to each other, i.e. facial features assigned the same label describe the same person.

Although the above description shows that the label assignment process is performed after the feature-value extraction process finishes, they may be performed together. Specifically, the co-appearance extraction unit 2020 may feed a sub video frame sequence and perform a set of the feature-value extraction and the label assignment for each frame of the sub video frame sequence. For example, in the above example case, the co-appearance extraction unit 2020 may feed a video frame sequence 32-$a$, extract feature-value v1, create a feature-information FI1, query the SimTree with v1, create a new label A being associated with FI1 in the people label table, and then sequentially process video frames 32-$b$ to 32-$e$ in the same manner.

«Detection of Co-Appearance Events of the Same Persons»

The co-appearance event extraction unit 2020 detects a co-appearance event of two or more of labels in a sub video frame sequence, as a co-appearance event of the persons corresponding to the labels in the sub video frame sequence.

Suppose that, a label A is associated with the feature-value information FI1 indicating the feature-value v1 and the timestamp t1; a label B is associated with the feature-value information indicating the feature-value v2 and the timestamp t2; and both of t1 and t2 are within the time range of the same sub video frame sequence. In this case, the co-appearance event extraction unit 2020 detects the co-appearance event of the labels A and B. This co-appearance event of labels A and B means the co-appearance event of the two persons corresponding to the label A and B.

«Example for Combination Scan Algorithm»

The following is an example algorithm of the combination scan process. The inputs of this algorithm include feature-values, a time window, and a frequency threshold. The label assignment process has been executed for each input feature-value, and thus each input feature-value is associated with a label by, for example, the people label table.

Figure 14:
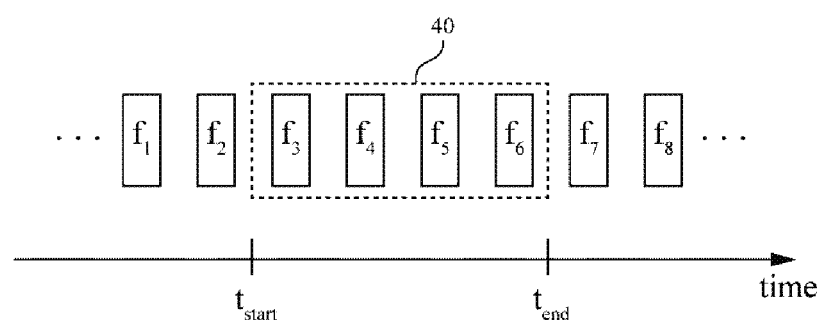
FIG. 14 illustrates a correspondence between the sub video frame sequence and the time window.

The time window is a pair of timestamps ($t_{start}$, $t_{end}$), where $t_{end} \geq t_{start}$ and the size of the time window, i.e. $t_{end} - t_{start}$, is the pre-determined size. A sub video frame sequence of a video frame sequence corresponds to a time window. FIG. 14 illustrates the correspondence between the sub video frame sequence and the time window. The sub video frame sequence 40 starts from the earliest video frame in the video frame sequence having the timestamp equal to or greater than $t_{start}$: $f_3$ in FIG. 14 The sub video frame sequence 40 ends at the last video frame in the video frame sequence having timestamp equal to or less than $t_{end}$: $f_6$ in FIG. 14 Note that, sub video frame sequences in the video frame sequences generated by the same surveillance camera do not overlap each other. The frequency threshold defines the minimum frequency of a co-appearance event.

Note that, the time window and the frequency threshold may be set to the co-appearance event extraction unit 2020 in advance, or may be stored in a storage medium that the co-appearance event extraction unit accesses.

The algorithm maintains a label table and a count table. The label table has 2 columns: the label column and the count column. The count column indicates the number of the corresponding label in the current time window.

The count table has 3 columns: the event column, the count column, and the latest update column. The event column indicates a co-appearance event of multiple persons. The count column indicates the frequency of the corresponding event. The latest update column indicates the latest update timestamp of the corresponding co-appearance event.

At the beginning, the label table and the count table are empty.

Figure 15:
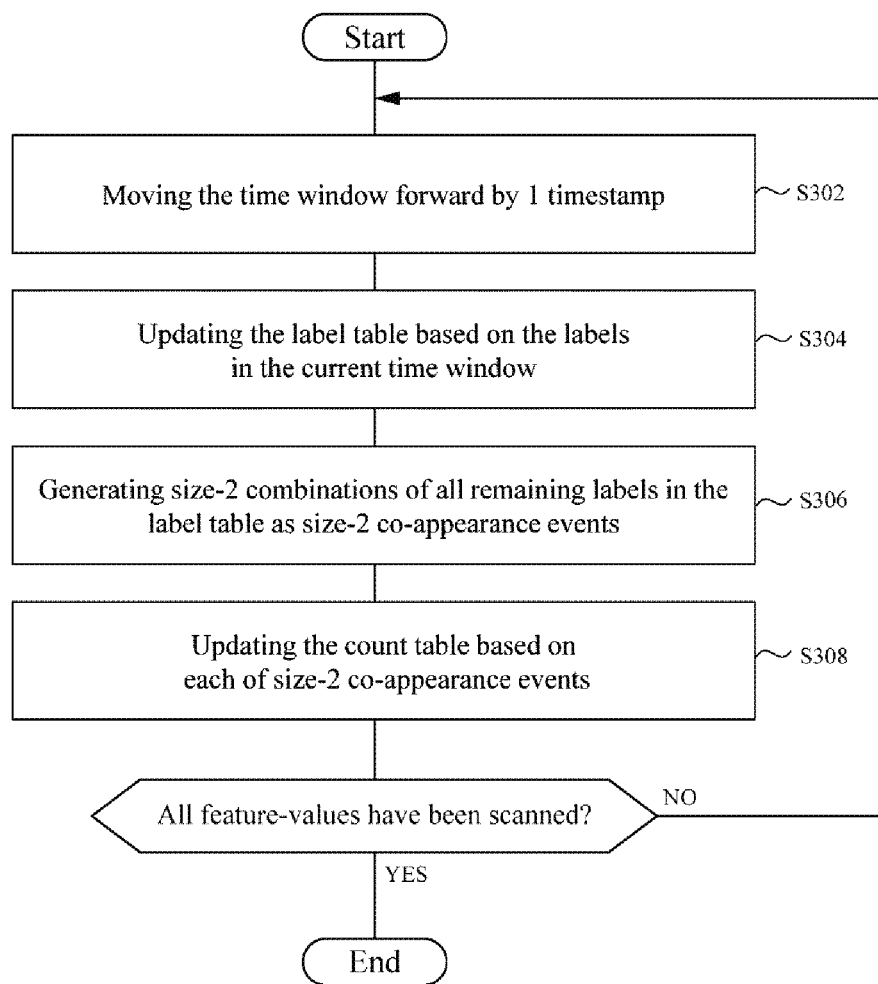
FIG. 15 illustrates an example flowchart of the label assignment algorithm.

FIG. 15 illustrates an example flowchart of the label assignment algorithm. The detail of the combination scan algorithm is described below with referring to FIG. 15.

The co-appearance event extraction unit 2020 moves the time window forward by 1 timestamp (S302).

Figure 16:
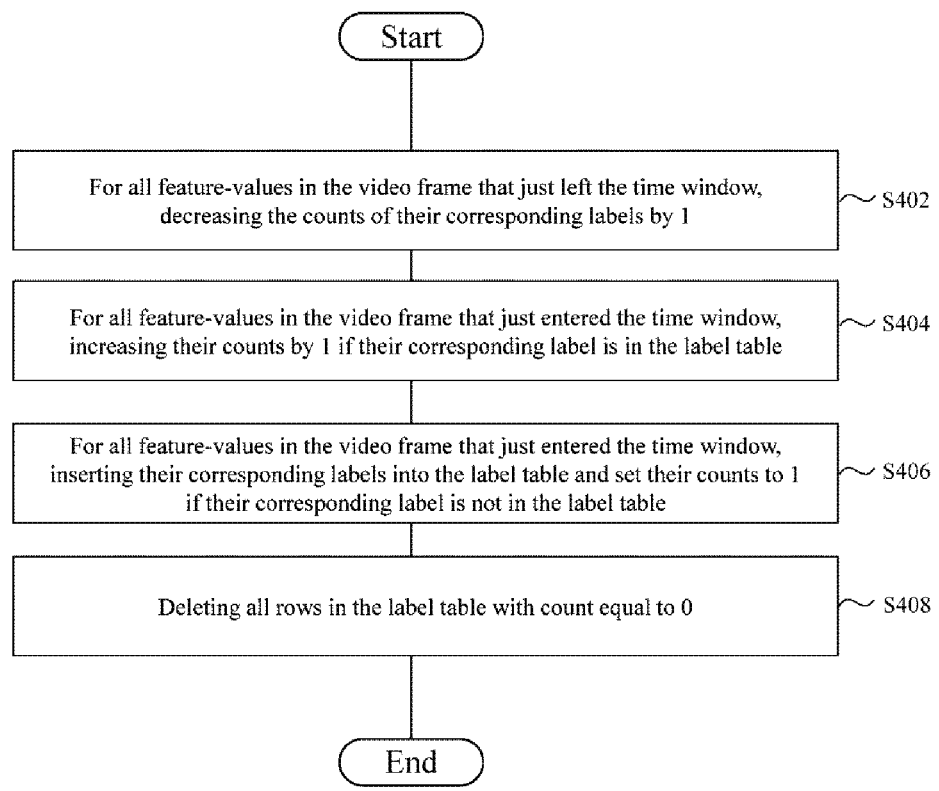
FIG. 16 illustrates a flowchart describing a detail of S304.

The co-appearance event extraction unit 2020 updates the label table based on the labels in the current time window (S304). Step S304 includes the following sub steps S402 to S408, which are described in FIG. 16.

For all feature-values in the video frame that just left the time window, the co-appearance event extraction unit 2020 decreases the counts of their corresponding labels by 1 (S402). For all feature-values in the video frame that just entered the time window, if their corresponding label is in the label table, the co-appearance event extraction unit 2020 increases their counts by 1 (S404); if their corresponding label is not in the label table, the co-appearance event extraction unit 2020 inserts their corresponding labels into the label table and set their counts to 1 (S406). The co-appearance event extraction unit 2020 deletes all rows in the label table with count equal to 0 (S408).

The co-appearance event extraction unit 2020 generates size-2 combinations of all remaining labels in the label table as size-2 co-appearance events (S306).

Figure 17:
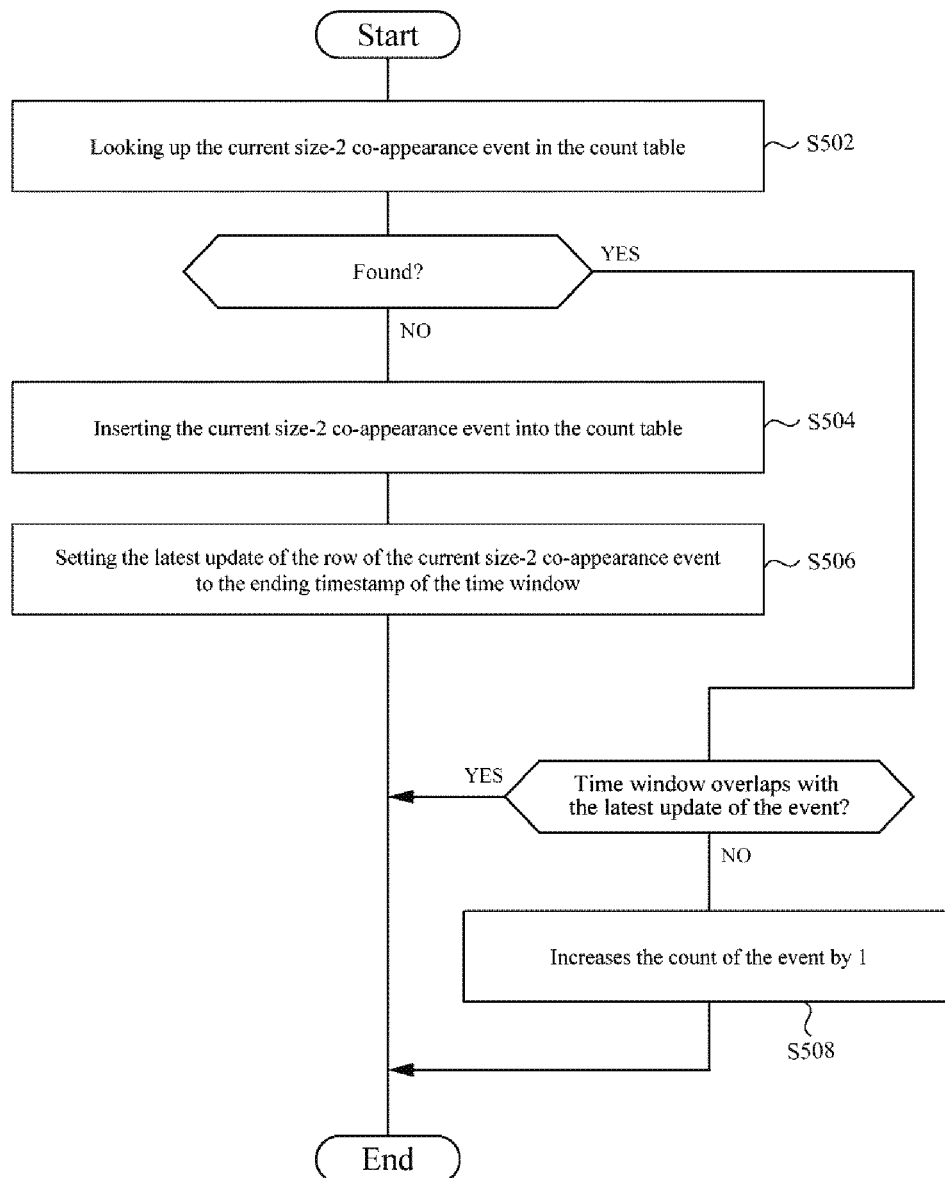
FIG. 17 illustrates a flowchart describing a detail of S308.

The co-appearance event extraction unit 2020 updates the count table based on each of size-2 co-appearance events (S308). Step S308 includes sub steps S502 to 508, which are described in FIG. 17. Steps S502 to S508 are performed for each size-2 co-appearance events.

The co-appearance event extraction unit 2020 looks up the current size-2 co-appearance event in the count table (S502). If the current size-2 co-appearance event is not in the count table, the co-appearance event extraction unit 2020 inserts the current size-2 co-appearance event into the count table (S504), and set the latest update of the row of the current size-2 co-appearance event to the ending timestamp of the time window (S506).

On the other hand, if the current size-2 co-appearance event is in the count table and time window does not overlap with the latest update of the event, the co-appearance event extraction unit 2020 increases the count of the event by 1 (S508); otherwise, the count is not increased.

The algorithm terminates when all feature-values have been scanned; otherwise, the execution goes to step S302.

Insertion and deletion of count table and label table (S304 and S308) can be done in O(1) if hashing is used. The worst case time complexity of the combination scan algorithm is $O(m \times n \times {}_mC_2)$, where m is the number of feature-values in a video frame, ${}_mC_2$ is the number of size-2 co-appearance events of m, and n is the number of video frames in the video frame sequences fed by the combination scan algorithm.

Note that, the above algorithm handles co-appearances of two persons by generating size-2 combinations of labels, as an example. However, the above algorithm can be easily modified to handle co-appearances of N persons by generating size-N combinations of labels.

<<<Example Case of Combination Scan Process>>>

This case is a continuation of the example case for the label assignment algorithm, and thus illustrated by FIG. 8. In this example case, the length of the time window is 3 timestamps.

At time $t_3$, labels A, B, and C are in the current time window so they are inserted into the label table. Size-2 combinations of A, B, and C are AB, BC, and AC. All the size-2 combinations are inserted into the count table. Their counts are set to 1 and latest updates are set to 3, which is the current timestamp. FIG. 18 shows the label table and count table after the update at time $t_3$.

Then, the time window is moved forward by 1 timestamp. At time $t_4$, due to the video frame just left the time window, count of label A is decreased by 1 in the label table. Then, due to the new video frame just entered the time window, counts of label A and B are increased by 1 and a new label D is created in the label table. Size-2 combinations of A, B, C, and D are AB, BC, AC, AD, BD, and CD. As the current time window overlaps with the latest update of pattern AB, BC, and AC in the count table, count of them are not updated. Co-appearance events of AD, BD, and CD are inserted into the count table and their counts are set to 1, and latest updates are set to 4, which is the current timestamps. FIG. 19 shows the label table and count table after the update at time $t_4$.

At time $t_5$, due to the video frame just left the time window, count of label B is decreased by 1 in the label table. Then, due to the new video frame just entered the time window, count of label A is increased by 1. As the count of label B is zero, B is removed from label table. Size-2 combinations of A, C, and D are AC, AD, and CD. As the current time window overlaps with the latest update of co-appearance events AC, AD, and CD in the count table, count of them are not updated. FIG. 20 shows the label table and count table after the update at time $t_5$.

The frequent event detection unit 2040 may detect a size-N combination the frequency of which is equal to or greater than the frequency threshold, as the co-appearance events of the same persons described by the size-N combination. The analysis apparatus 2000 may handle, as the frequency of the size-N combinations, the count indicated by the count table as it is or the count divided by the total number of forwarding timestamps in S302 of FIG. 15 (the total time length of the computed video frame sequences).

Exemplary Embodiment 2

Figure 21:
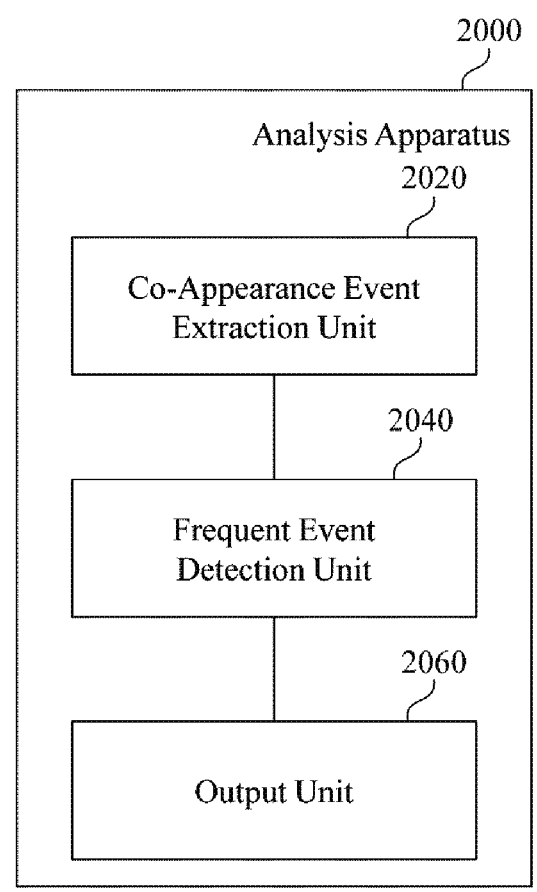
FIG. 21 is a block diagram illustrating the analysis apparatus according to Exemplary embodiment 2.

FIG. 21 is a block diagram illustrating the analysis apparatus 2000 according to Exemplary embodiment 2. In FIG. 21, each block represents a function-based configuration block rather than a hardware-based configuration block. Note that, the analysis system 2000 of Exemplary embodiment 2 has the same functions as that of Exemplary embodiment 1 except the functions described below.

The analysis apparatus 2000 of this exemplary embodiment further comprises an output unit 2060. The output unit 2060 outputs one or more of the co-appearance events of the same persons that the frequent event detection unit detects.

The output unit 2060 may output the frequent co-appearance events of the same persons in various forms. In some embodiments, the output unit 2060 may write the information indicating the frequent co-appearance events of the same persons to a storage medium. In some embodiments, the output unit 2060 may transmit the information indicating the frequent co-appearance events of the same persons to another computer through the network. In some embodiments, the output unit 2060 may display the information indicating the frequent co-appearance events of the same persons to another computer on a display device.

<Advantages Effect>

In accordance with the present invention, the set of the frequent co-appearance events of the same persons can be obtained. Thus, a user of the analysis apparatus 2000 can recognize suspicious activities from the surveillance videos eve if the entities of the suspicious activities are not close enough to be captured in the same frame.

<Example of Formal Definitions>

FIGS. 22 and 23 describes an example of formal definitions of data structures handled by the analysis apparatus 2000. Note that, formal definitions of them are not limited to those described in FIGS. 22 and 23.

As described above, although the exemplary embodiments of the present invention have been set forth with reference to the accompanying drawings, these exemplary embodiments are merely illustrative of the present invention, and a combination of the above exemplary embodiments and various configurations other than those in the above-mentioned exemplary embodiments can also be adopted.

In the following, various reference embodiments of the present invention are described.

Appendix 1

An analysis apparatus comprising:

a co-appearance event extraction unit extracting a co-appearance event of two or more persons from each of a plurality of sub video frame sequences, the sub video frame sequence being included in a video frame sequence generated by a surveillance camera, each of the sub video frame sequences having a predetermined time length; and a frequent event detection unit detecting co-appearance events of same persons occurring at a frequency higher than or equal to a pre-determined frequency threshold, wherein in at least one of the co-appearance events of two or more persons, a first video frame from which a person is extracted is different from a second video frame from which another person is extracted.

Appendix 2

The analysis apparatus according to Appendix 1, further comprising an output unit outputting the co-appearance events of the same persons occurring at a frequency higher than or equal to a pre-determined frequency threshold, as an indication of a suspicious activity.

Appendix 3

The analysis apparatus according to Appendix 1 or 2,
wherein the co-appearance event extraction unit assigns a label to each of feature-values extracted from video frames of the video frame sequences, the feature-value indicating a feature of a person, feature-values indicating features of the same person being assigned the same label, feature-values indicating features of different persons being assigned different labels, and
wherein the frequent event detection unit handles the co-appearance events of a first label and a second label as the co-appearance events of a first person and a second person, the first label being assigned to a feature-value indicating a feature of the first person, the second label being assigned to a feature-value indicating a feature of the second person.

Appendix 4

The analysis apparatus according to Appendix 3, wherein the co-appearance event extraction unit assigns labels to the feature-values by repeatedly performing for each of the feature-values:
determining whether or not there is a feature-value to which a label is already assigned and which is similar to a current feature-value;
when there is no feature-value to which a label is already assigned and which is similar to a current feature-value, assigning a new label to the current feature-value; and
when there is a feature-value to which a label is already assigned and which is similar to a current feature-value, assigning to the current feature-value the same label with a feature-value most similar to the current feature-value.

Appendix 5

The analysis apparatus according to Appendices 3 or 4, wherein the frequent event detection unit performs:
for each sub video frames, calculating a size-N(N is an integer greater than 0) combinations of labels assigned to the feature-values extracted from the sub video frame:
counting the number of each size-N combinations included in the sub video frames; and
detecting the size-N combinations of the same labels the number of which is greater than or equal to the pre-determined frequency threshold, as the co-appearance events of the same persons occurring at a frequency higher than or equal to the pre-determined frequency threshold.

Appendix 6

An analysis method executed by a computer, the method comprising:
a co-appearance event extraction step of extracting a co-appearance event of two or more persons from each of a plurality of sub video frame sequences, the sub video frame sequence being included in a video frame sequence generated by a surveillance cameras, each of the sub video frame sequences having a predetermined time length; and
a frequent event detection step of detecting co-appearance events of same persons occurring at a frequency higher than or equal to a pre-determined frequency threshold,
wherein in at least one of the co-appearance events of two or more persons, a first video frame from which a person is extracted is different from a second video frame from which another person is extracted.

Appendix 7

The analysis method according to Appendix 6, further comprising an output step of outputting the co-appearance events of the same persons occurring at a frequency higher than or equal to a pre-determined frequency threshold, as an indication of a suspicious activity.

Appendix 8

The analysis method according to Appendix 6 or 7,
wherein the co-appearance event extraction step assigns a label to each of feature-values extracted from video frames of the video frame sequences, the feature-value indicating a feature of a person, feature-values indicating features of the same person being assigned the same label, feature-values indicating features of different persons being assigned different labels, and
wherein the frequent event detection step handles the co-appearance events of a first label and a second label as the co-appearance events of a first person and a second person, the first label being assigned to a feature-value indicating a feature of the first person, the second label being assigned to a feature-value indicating a feature of the second person.

Appendix 9

The analysis method according to Appendix 8, wherein the co-appearance event extraction step assigns labels to the feature-values by repeatedly performs for each of the feature-values:
determining whether or not there is a feature-value to which a label is already assigned and which is similar to a current feature-value;
when there is no feature-value to which a label is already assigned and which is similar to a current feature-value, assigning a new label to the current feature-value; and
when there is a feature-value to which a label is already assigned and which is similar to a current feature-value, assigning to the current feature-value the same label with a feature-value most similar to the current feature-value.

Appendix 10

The analysis method according to Appendix 8 or 9, wherein the frequent event detection unit performs:

for each sub video frames, calculating a size-N(N is an integer greater than 0) combinations of labels assigned to the feature-values extracted from the sub video frame:

counting the number of each size-N combinations included in the sub video frames; and detecting the size-N combinations of the same labels the number of which is greater than or equal to the pre-determined frequency threshold, as the co-appearance events of the same persons occurring at a frequency higher than or equal to the pre-determined frequency threshold.

Appendix 11

A non-transitory computer-readable storage medium storing a program causing a computer to execute each step of the analysis method according to Appendices 6 to 10.

The invention claimed is:

1. An analysis apparatus comprising:
at least one memory storing instructions; and
at least one processor executing the instructions to perform:
extracting a co-appearance event from a video frame sequence, wherein the co-appearance event is that an unspecified combination of persons appears in the video frame sequence among a predetermined time window; and
outputting information indicating the co-appearance event when the co-appearance event occurred at a frequency higher than or equal to a pre-determined threshold, wherein in at least one co-appearance event of the unspecified combination of persons, a first video frame from which a person is extracted is different from a second video frame from which another person is extracted,
wherein the co-appearance event specifies at least each of the person and the another person, and
wherein the co-appearance event specifies that the unspecified combination of persons appeared in sequence in the video frame sequence among the predetermined time window and that the person appeared in the video frame sequence before the different person appeared in the video frame sequence.

2. The analysis apparatus according to claim 1, wherein the at least one processor further performs:
creating an entry of the label in a people label table, wherein the people label table includes a label column and a count column, the label column indicating the label and the count column indicating a number of the label in the time window;
for all feature-values in the video frame that just entered the time window, increasing their number by 1; and
for all feature-values in the video frame that just left the time window, decreasing the number of the label by 1.

3. The analysis apparatus according to claim 1, wherein the at least one processor further performs:
updating a count table for counting the co-appearance event, wherein the count table includes event column, count column, and latest update column, the event column indicating the co-appearance event, the count column indicating the frequency of the corresponding event, and the latest update column indicating a timestamp of the latest update of the co-appearance event.

4. An analysis method comprising:
extracting a co-appearance event from a video frame sequence, wherein the co-appearance event is that an unspecified combination of persons appears in the video frame sequence among a predetermined time window; and
outputting information indicating the co-appearance event when the co-appearance event occurred at a frequency higher than or equal to a pre-determined threshold, wherein in at least one co-appearance event of the unspecified combination of persons, a first video frame from which a person is extracted is different from a second video frame from which another person is extracted,
wherein the co-appearance event specifies at least each of the person and the another person, and
wherein the co-appearance event specifies that the unspecified combination of persons appeared in sequence in the video frame sequence among the predetermined time window and that the person appeared in the video frame sequence before the different person appeared in the video frame sequence.

5. The analysis method according to claim 4, further comprising:
creating an entry of the label in a people label table, wherein the people label table includes a label column and a count column, the label column indicating the label and the count column indicating a number of the label in the time window;
for all feature-values in the video frame that just entered the time window, increasing their number by 1; and
for all feature-values in the video frame that just left the time window, decreasing the number of the label by 1.

6. The analysis method according to claim 4, further comprising:
updating a count table for counting the co-appearance event, wherein the count table includes event column, count column, and latest update column, the event column indicating the co-appearance event, the count column indicating the frequency of the corresponding event, and the latest update column indicating a timestamp of the latest update of the co-appearance event.

7. A non-transitory recording medium storing computer programs, the computer program causing a computer to perform:
extracting a co-appearance event from a video frame sequence, wherein the co-appearance event is that an unspecified combination of persons appears in the video frame sequence among a predetermined time window; and
outputting information indicating the co-appearance event when the co-appearance event occurred at a frequency higher than or equal to a pre-determined threshold, wherein in at least one co-appearance event of the unspecified combination of persons, a first video frame from which a person is extracted is different from a second video frame from which another person is extracted,
wherein the co-appearance event specifies each of the person and the another person, and
wherein the co-appearance event specifies that the unspecified combination of persons appeared in sequence in the video frame sequence among the predetermined time window and that the person appeared in the video frame sequence before the different person appeared in the video frame sequence.

8. The non-transitory recording medium according to claim 7, wherein the computer program further causes the computer to perform:
   creating an entry of the label in a people label table, wherein the people label table includes a label column and a count column, the label column indicating the label and the count column indicating a number of the label in the time window;
   for all feature-values in the video frame that just entered the time window, increasing their number by 1; and
   for all feature-values in the video frame that just left the time window, decreasing the number of the label by 1.

9. The non-transitory recording medium according to claim 7, wherein the computer program further causes the computer to perform:
   updating a count table for counting the co-appearance event, wherein the count table includes event column, count column, and latest update column, the event column indicating the co-appearance event, the count column indicating the frequency of the corresponding event, and the latest update column indicating a timestamp of the latest update of the co-appearance event.

* * * * *